United States Patent [19]

Tada et al.

[11] Patent Number: 5,051,927
[45] Date of Patent: Sep. 24, 1991

[54] IMAGE EDITING APPARATUS FOR TRANSFERRING A PARTIAL IMAGE FROM ONE LOCALE TO ANOTHER

[75] Inventors: Kaoru Tada; Masamichi Sugiura, both of Osaka, Japan

[73] Assignee: Minolta Camera Kabushiki Kaisha, Osaka, Japan

[21] Appl. No.: 472,406

[22] Filed: Feb. 1, 1990

Related U.S. Application Data

[63] Continuation of Ser. No. 163,867, Mar. 3, 1988, abandoned.

[30] Foreign Application Priority Data

Mar. 3, 1987 [JP] Japan ................... 62-47923

[51] Int. Cl.⁵ ............................................ G06F 15/62
[52] U.S. Cl. ................................................... 364/521
[58] Field of Search ................ 364/518, 521; 340/724, 340/731; 382/47

[56] References Cited

U.S. PATENT DOCUMENTS

4,468,755 8/1984 Iida .
4,485,454 11/1984 Kimoto .
4,572,653 2/1986 Ito et al. .
4,622,641 11/1986 Stephens ............................ 364/518
4,654,651 3/1987 Kishi et al. .......................... 340/731
4,729,029 3/1988 Henri et al. ..................... 340/731 X
4,739,314 4/1988 McCaskill et al. ............. 340/731 X
4,751,507 6/1988 Hama et al. ......................... 340/724
4,800,514 1/1989 Earle ............................... 364/715.07
4,893,258 1/1990 Sakuragi ............................ 364/521

Primary Examiner—Dale M. Shaw
Assistant Examiner—Mark K. Zimmerman
Attorney, Agent, or Firm—Burns, Doane, Swecker & Mathis

[57] ABSTRACT

An image editing apparatus including an image display for displaying an image on a cathode-ray tube wherein a source area of the original is designated as is a destination area so that a partial image of the source area can be transferred to the destination area while information regarding the designation area and destination area are displayed on the CRT. Thus, the magnification and relative position of the image after editing can be readily appreciated by referring to the display on the CRT.

20 Claims, 10 Drawing Sheets

IMAGE EDITING APPARATUS FOR TRANSFERRING A PARTIAL IMAGE FROM ONE LOCALE TO ANOTHER

This application is a continuation of application Ser. No. 07/163,867, filed Mar. 3, 1988, abandoned.

BACKGROUND OF THE INVENTION

1. Field of the Invention

The present invention relates to an image editing system, and more particularly to an editing of an image including an enlargement and/or reduction operation in an image editing system having an image display apparatus such as a cathode-ray tube (CRT).

2. Description of the Prior Art

In an image editing system being capable of processing or editing an image read by an image input apparatus such as an image reader, an operator performs editing while looking at an image displayed on a scope of an image display apparatus.

In a prior art apparatus, an editing operation such as enlargement or reduction of a desired part of a image displayed on a scope is performed, for example, with use of a cursor displayed on the scope of the image display apparatus, and the cursor is moved by a mouse or cursor move keys on a keyboard.

For example, in an editing operation of an image, the designation of two points on the scope by the cross cursor results in a display of a rectangular frame defined by the two points as diagonally opposing apexes of the rectanglar frame. In this method, the rectanglar frame defines an area of a partial image to be enlarged or reduced, and when another rectangular frame is designated on the scope, it defines a designation area at which a partial image whose data having been enlarged or reduced is reproduced. Thus, an operator can recognize an edited image on the scope. However, the operator cannot know a magnification of image employed at that time readily from the rectangular frames. Therefore, it is a disadvantage of this method that it is difficult to enlarge or reduce a partial image at a predetermined magnification.

On the other hand, in another conventional editing method, a magnification of enlargement or reduction is set with ten-keys, and the enlargement or reduction is made at a desired magnification. However, according to this method, it is difficult to recognize relative positions and dimensions of partial images before and after enlargement or reduction on the display apparatus intuitionally, and an operator feels uneasy upon editing an image.

SUMMARY OF THE INVENTION

It is an object of the present invention to provide an image editing apparatus which makes it easy to edit an image on a scope of an image display apparatus.

An image editing apparatus according to this invention comprises display means for displaying an image on a scope thereof, means for designating a source area and a destination area in the image displayed on the scope, means for editing a partial image on the source area so as to transfer it to the destination area, and means for indicating information regarding designation of the source area and the destination area on the scope of the display means.

It is an advantage of the present invention that enlargement of a required magnification is operated easily referring the display of a magnification on a scope and that the relative position of an image after editing can be apprehended intuitionally by referring a frame displayed on the scope.

BRIEF DESCRIPTION OF THE DRAWINGS

With reference to the accompanying drawings.

DETAILED DESCRIPTION OF THE PREFERRED EMBODIMENTS

Figure 1:
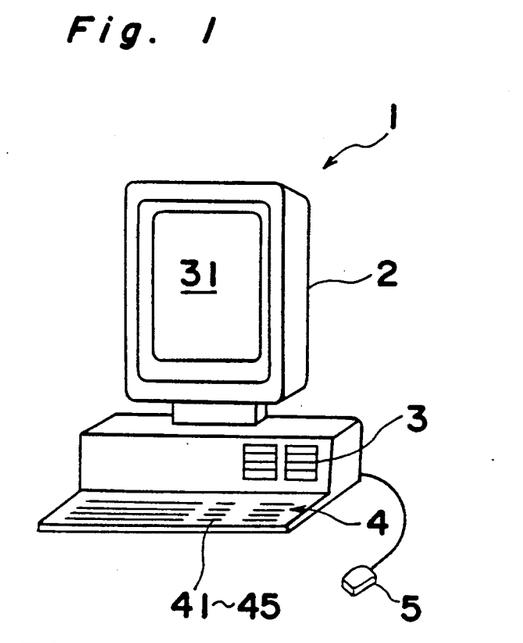
FIG. 1 is a perspective view of an image editing apparatus.

Referring now to the drawings, FIG. 1 shows an image editing apparatus 1 which has a CRT 2 as a display unit, a floppy disc drive 3 for loading an editing program, a keyboard 4 including various function keys and a mouse 5 for designating an area to be edited.

Figure 2:
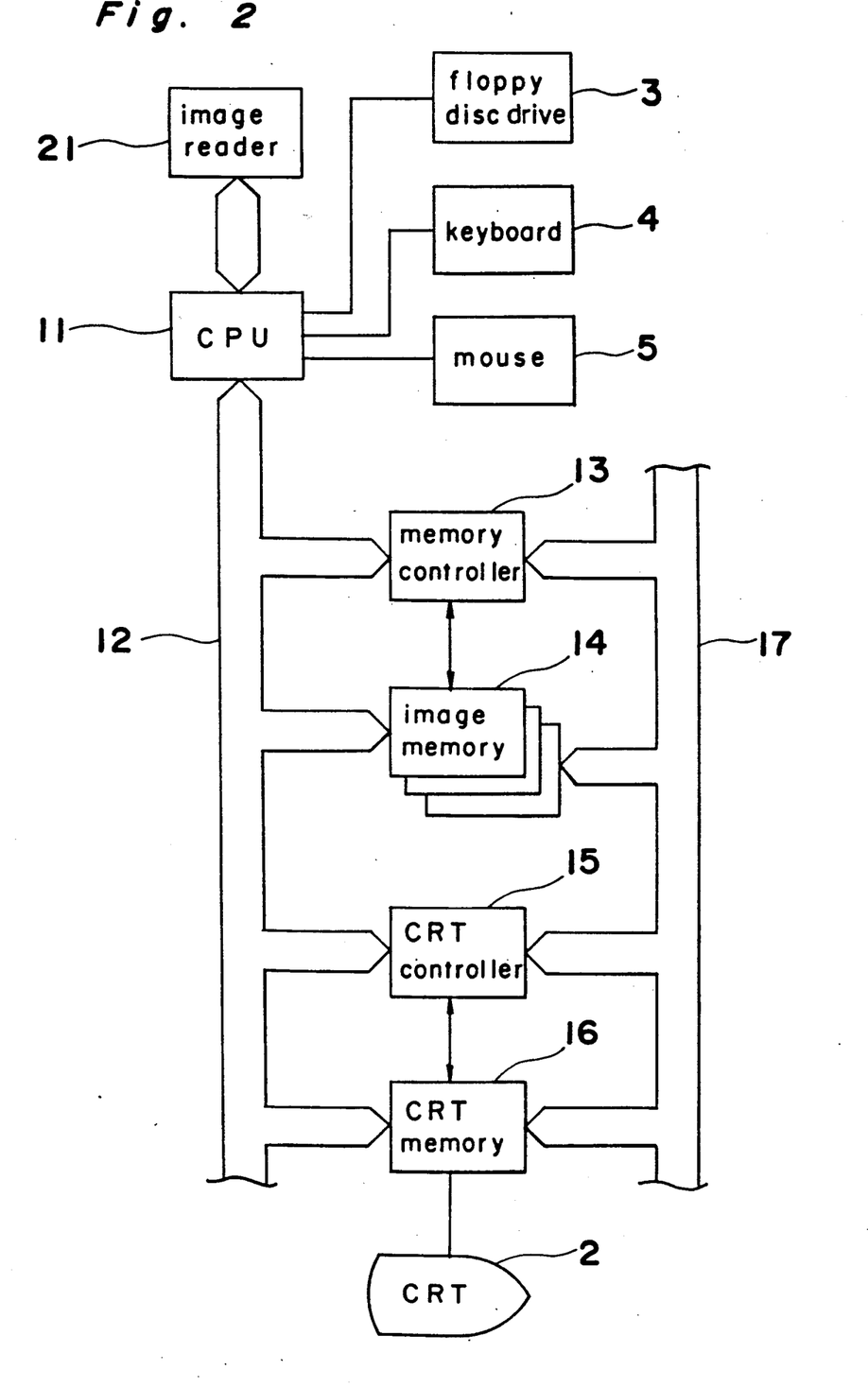
FIG. 2 is a block diagram of the image editing apparatus.

FIG. 2 shows a block diagram of an editing system of the image editing apparatus 1. A CPU (a microcomputer) 11 is provided to control a memory controller 13, an image memory 14, a CRT controller 15 and a CRT memory 16 via a system bus 12. The memory controller 13 controls the image memory 14 in order to access image data thereof. The CRT controller 15 controls the CRT 2 via the CRT memory 16 so as to display an image according to image data stored in the CRT memory 16 on the CRT 2. These devices 13 to 16 are connected to each other via an image bus 17.

Figure 3:
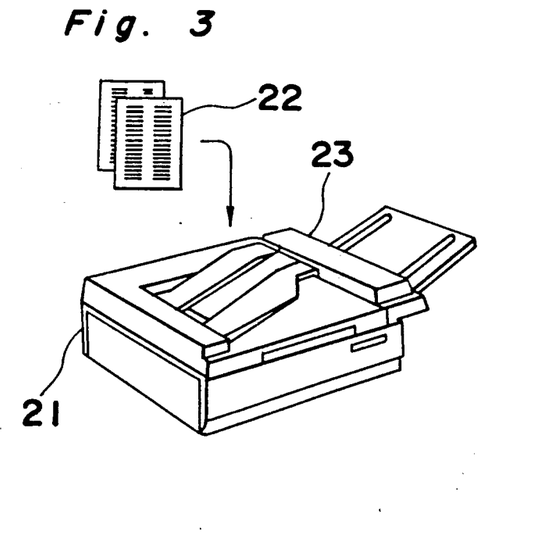
FIG. 3 is a perspective view of an image reader.

An image reader 21, shown in FIG. 3, reads an image of a document 22 with a CCD (charge-coupled device) image sensor, and outputs bi-level image data to the image editing apparatus 1. The structure of the image reader 21 is disclosed in detail in U.S. patent application Ser. No. 865,894 filed on May 21, 1986.

A document feeder 23 is equipped on a platen at the top of the image reader 21, and it feeds a document 22 automatically onto the platen. The structure of the document feeder 23 is disclosed in detail in U.S. Pat. No. 4,572,653.

The size of a document 22 and the set direction thereof are automatically detected by sensors arranged in the document feeder 23 upon feeding the document to the platen. Hereinafter, the size and the set direction of a document is indicated by symbolic characters such as A4-V, LETTER-H or the like. The head portion of them represents a size of a document and "V" or "H" represent a set direction. Namely, "V" denotes that the lengthwise direction of the document is set parallel to the feeding direction and "H" denotes that it is set orthogonal to the feeding direction. As mentioned above, it becomes necessary to display an image upon editing it in order to confirm the whole layout of an edited image.

In general, the resolutions of image proper to the input unit and the image editing apparatus 1 are different from that of the display apparatus. Usually, the resolution of the display apparatus is coarser than that of the image editing apparatus. Accordingly, it becomes necessary to reduce an image in order to display the whole image on a scope 32 of the display apparatus 2. In the present preferred embodiment of the present invention, an image can be displayed after selecting a reduced scale automatically which can display the whole image on the display apparatus 2 by taking into account the size of an input image and the display size of the display apparatus 2.

Figure 4:
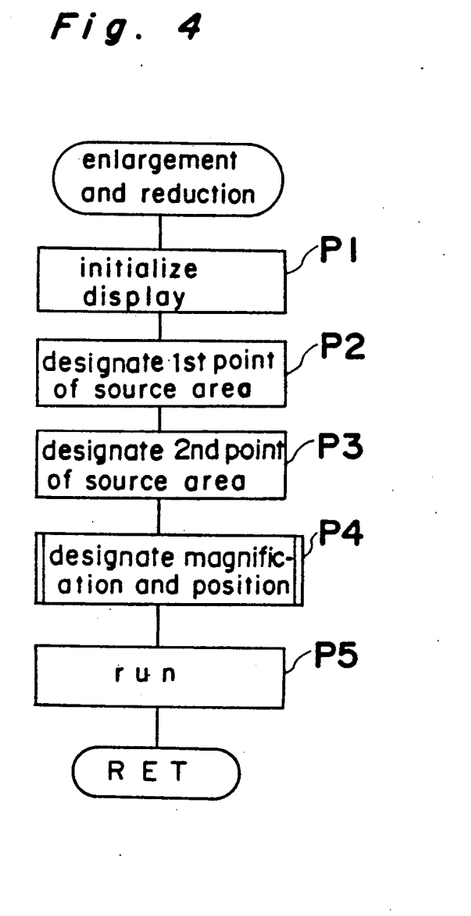
FIG. 4 is a flowchart of enlargement and reduction.
Figure 5A:
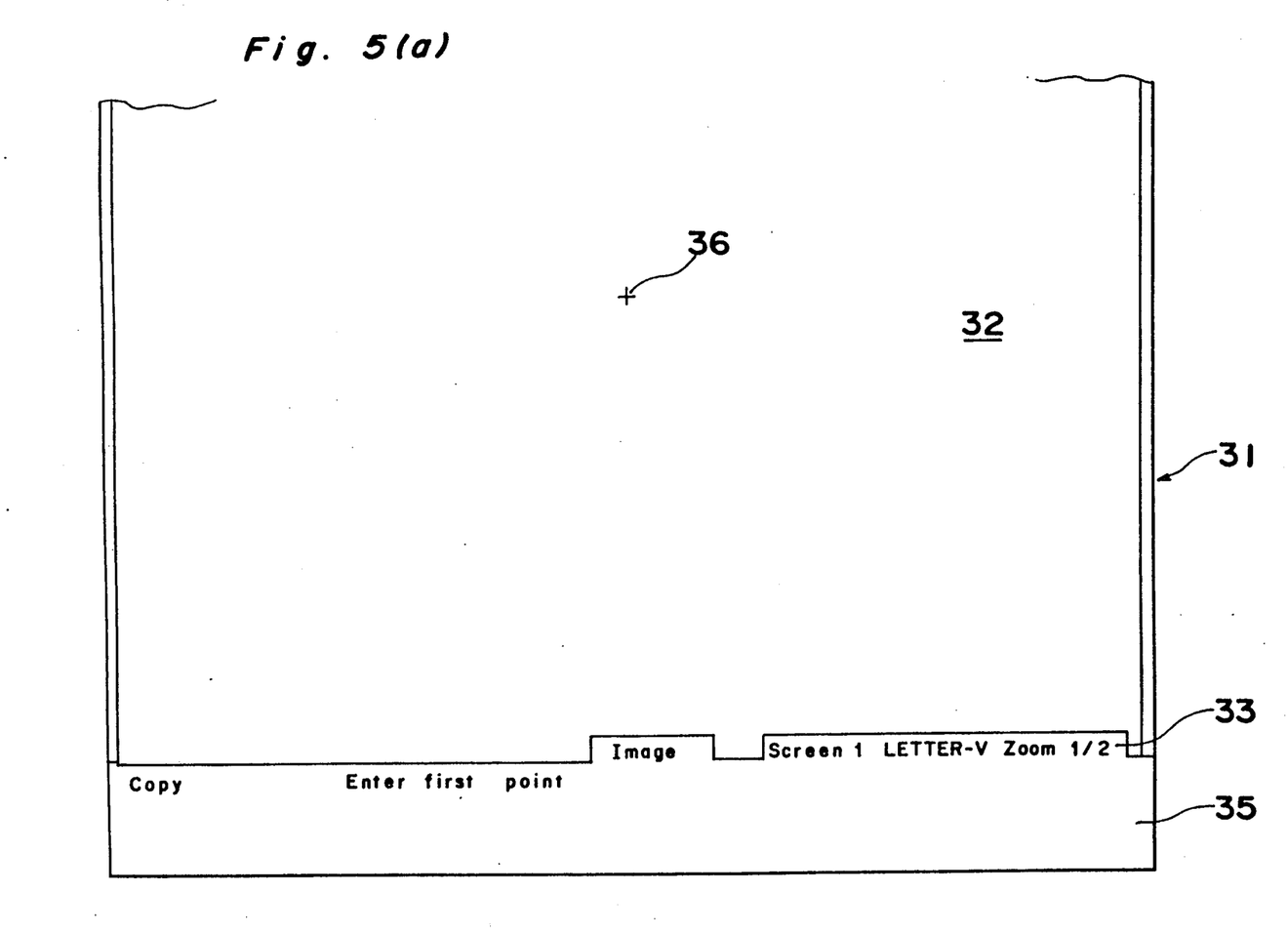
FIGS. 5(a)-5(e) are diagrams which show a scope on the editing of enlargement and reduction successively.

FIG. 4 shows a flow-chart of a program to be excuted by CPU 11 upon enlarging or reducing a part of a displayed image, while FIGS. 5(a) to 5(e) illustrate the scope corresponding to successive operation steps according to the present invention. When the enlargement/reduction function is selected or an icon 34a for enlargement/reduction is selected in a menu 34 displayed at the bottom of the scope 31 as shown in FIG. 6, the scope of the display apparatus is initialized (step Pl). In this state, a cross cursor 36 is displayed at the center of an image area 32 of the scope 31 when the mouse 5 is used, as shown in FIG. 5(a). On the other hand, a normal cursor is displayed when cursor move keys 41 to 44 on the keyboard 4 (see FIG. 7) are used.

Figure 5B:
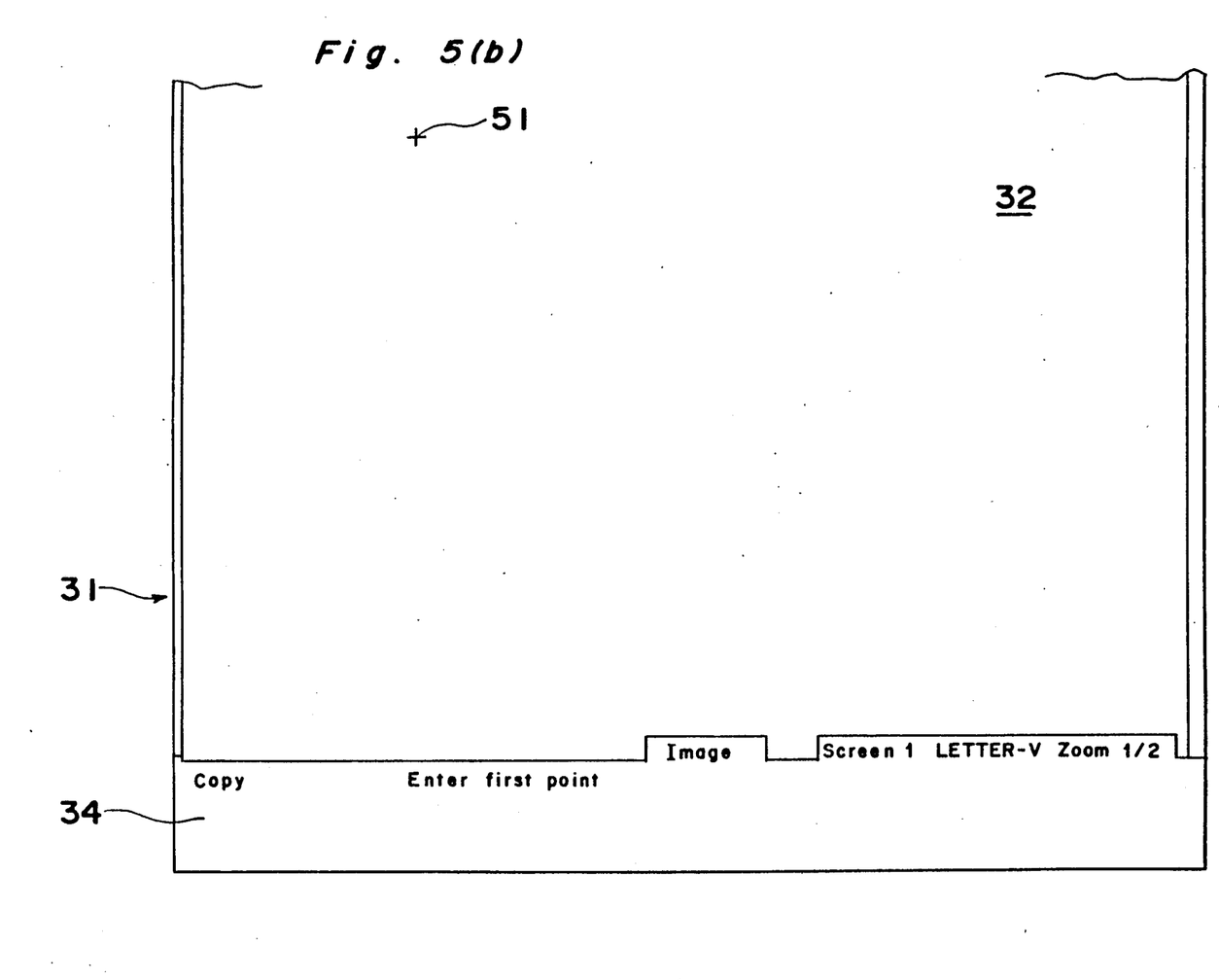
Figure 5C:
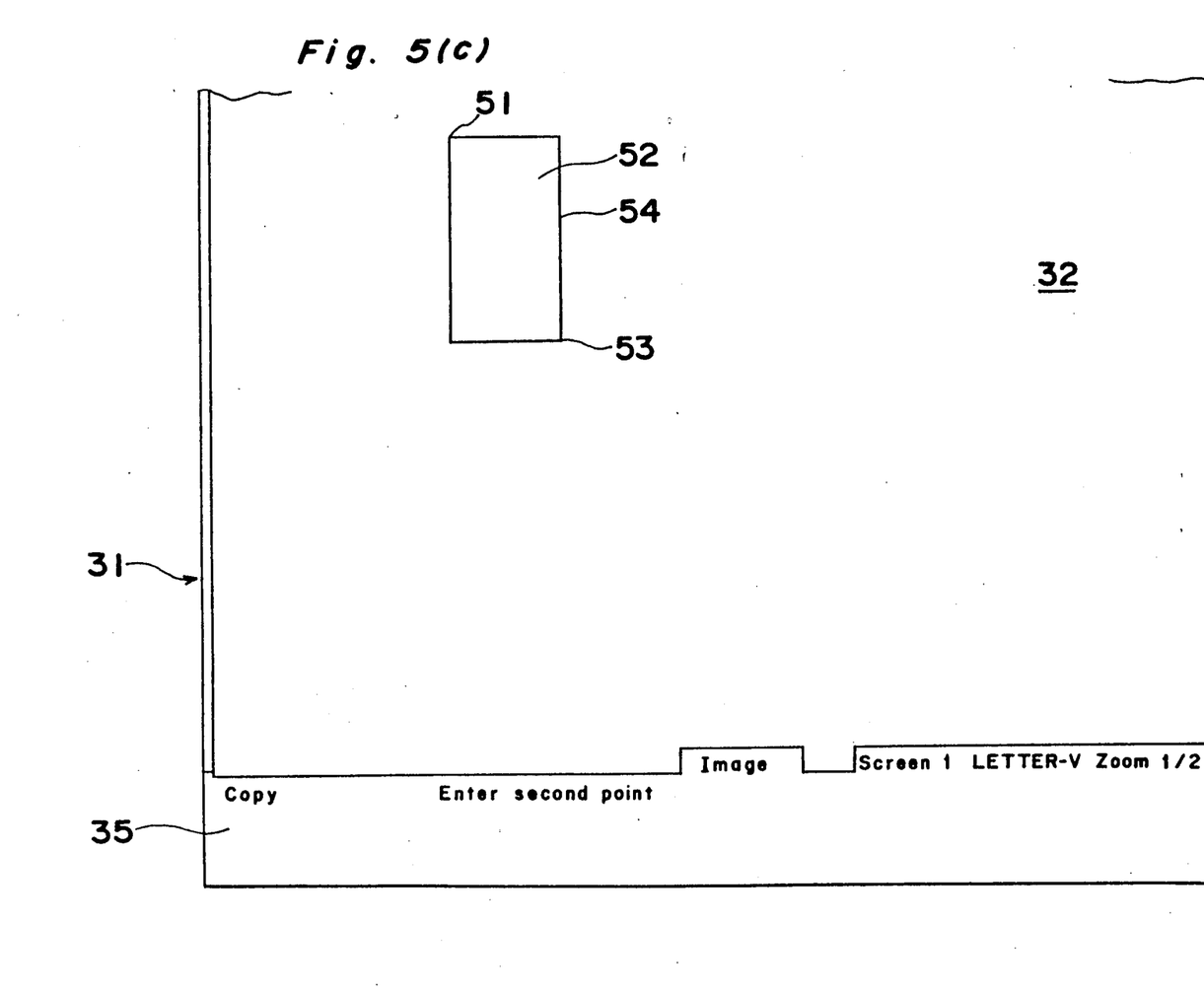
Figure 6:
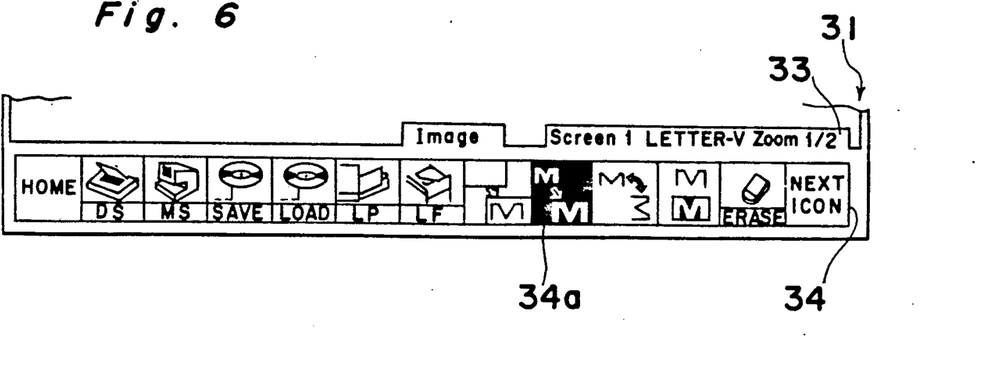
FIG. 6 is a diagram of copy menu.

Next, a first point (a upper left apex) 51 of a source area which defines an area of a displayed image to be enlarged or reduced is designated by the mouse 5 or the cursor move keys 41 to 44, as shown in FIG. 5(b) (step P2). Further, a second point (a lower right apex) 53 of the source area is designated similarly as shown in FIG. 5(c) (step P3). Thus, addresses on the image memory 14 representing the source area 52 which is defined as a rectangle having the first and second points 51 and 53 as diagonally opposing apexes are specified and a frame 54 representing the source area 52 is displayed on the scope 31.

Figure 5D:
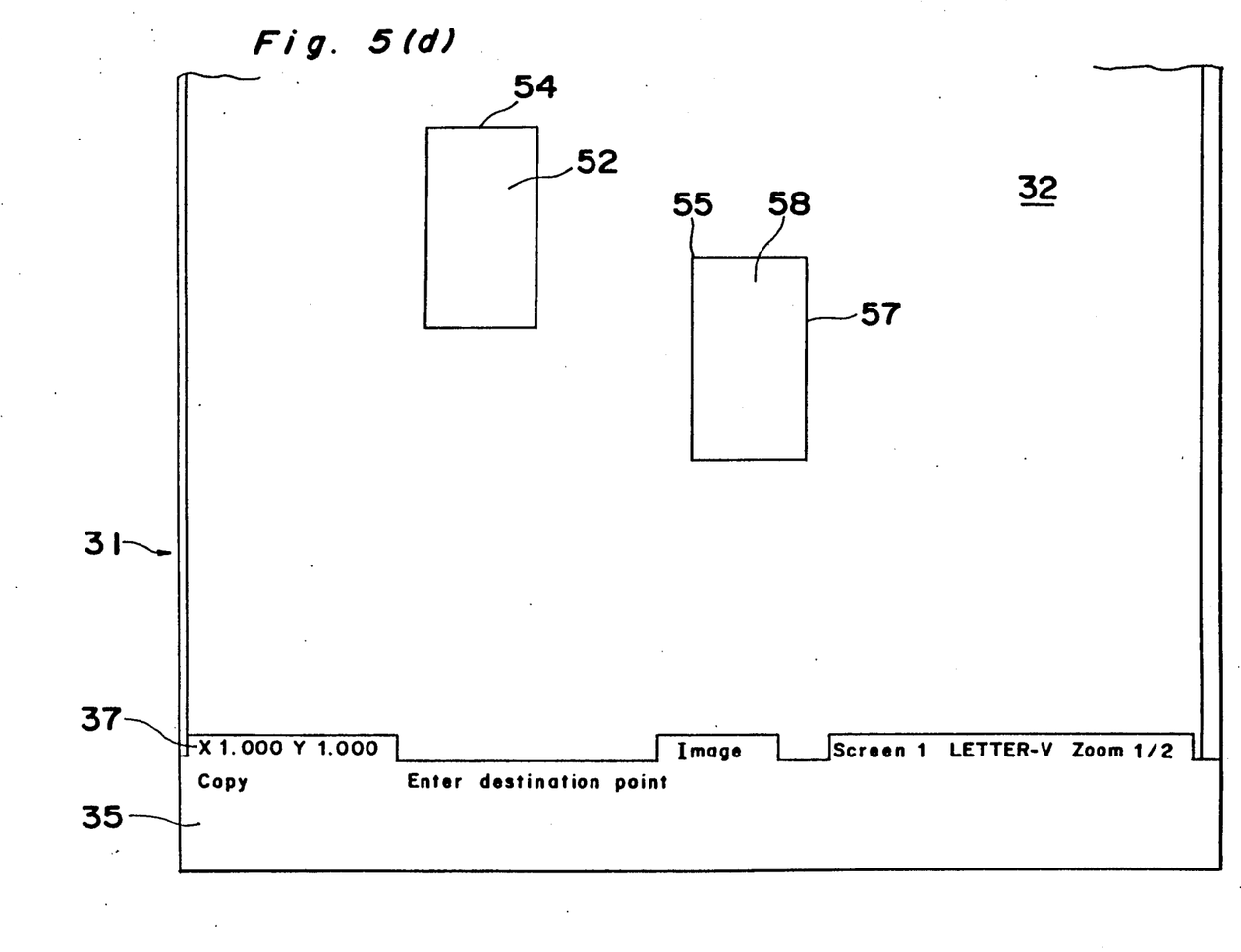

Next, an address (destination address) of a point according to which an enlarged or reduced partial image is reproduced, and a position of image are designated (step P4). Namely, as shown in FIG. 5(d), a upper left point (apex) 55 of an area (a transfer area 58) to which a partial image in the source area 52 is transferred is designated by moving the cross cursor 35 with the mouse 5. When it is designated, a frame 57 of the transfer area 58 having the same dimensions as those of the frame 54 of the source area 52 is displayed on the scope 31.

Figure 5E:
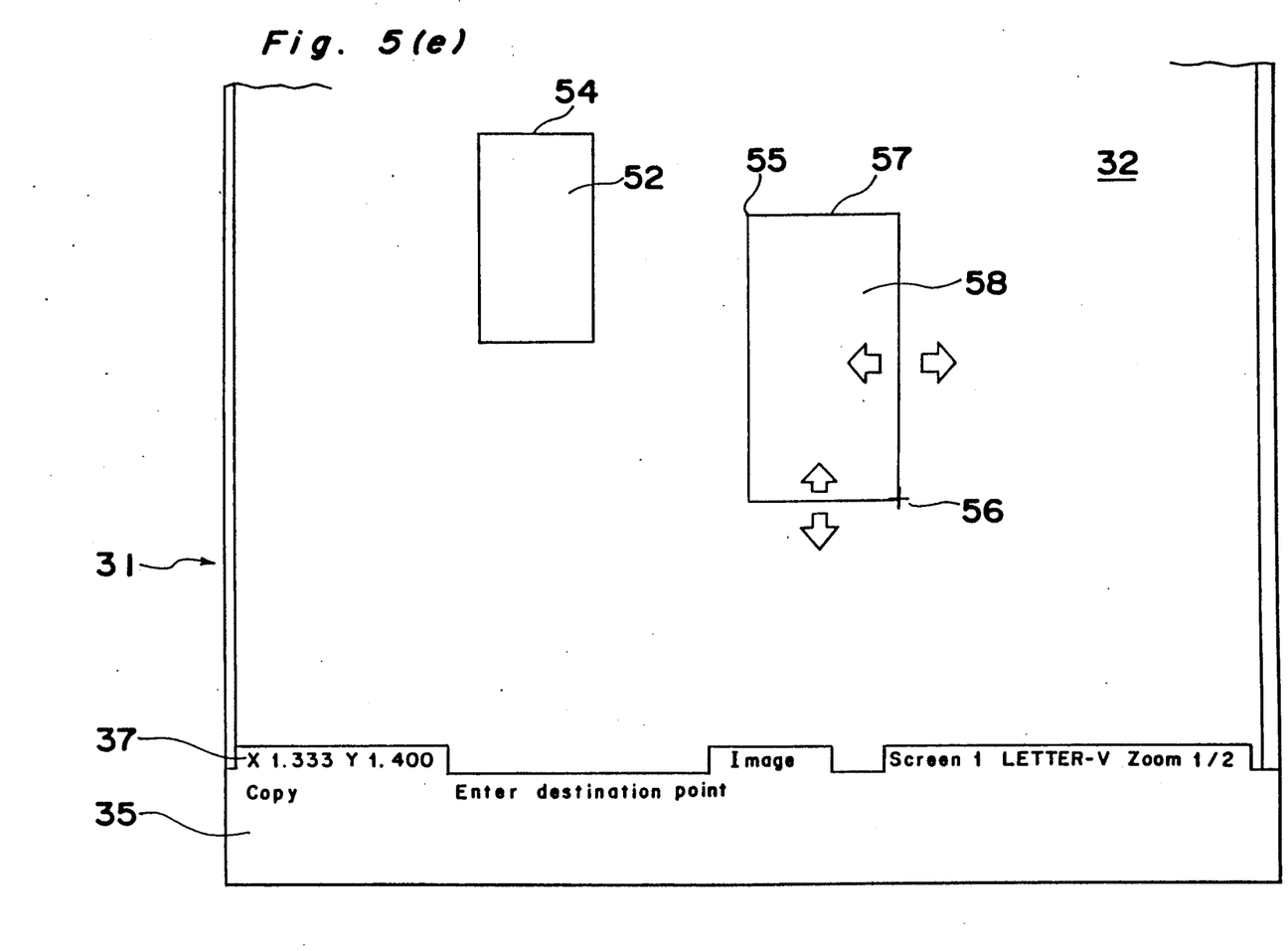

If the second point 56 at the lower right apex of the transfer area 58 is moved by the mouse 5 in the enlarging/reducing mode, the frame 57 is enlarged or reduced according to the movement, as illustrated by arrows in FIG. 5(e), because the transfer area 58 is defined by the first and second points 55 and 56. Then, respective magnifications of the enlargement/reduction in X (horizontal) and Y (vertical) directions are calculated from the source area 52 and the transfer area 58 and displayed at a display area 37 assigned to display the magnifications at the lower left of the image 32.

Finally, the data in the CRT memory 16 is processed according to the conditions set on the enlarging/reducing (step P5). The position on the scope 31 is defined by the horizontal coordinate X and the vertical coordinate Y with the origin at the upper left point, and an address of the CRT memory 16 is related to an address (X,Y) on the scope 31. Thus, CPU 11 processes image data in the CRT memory 16 according to the four points 51, 53, 55, 56 and the magnifications in the horizontal and vertical directions.

Figure 7:
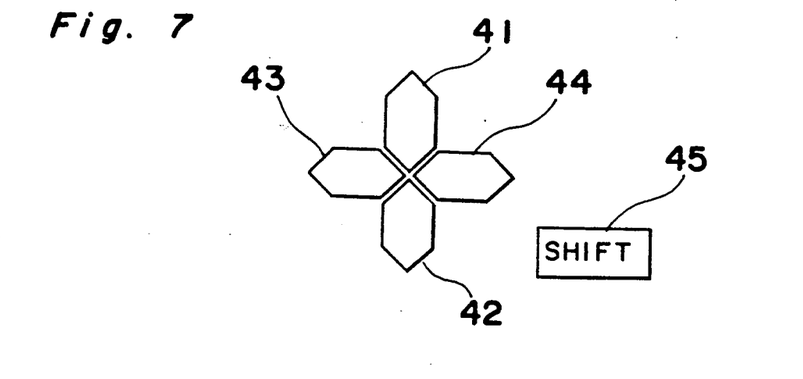
FIG. 7 is a diagram which shows the arrangement of cursor move keys and shift key.
Figure 8:
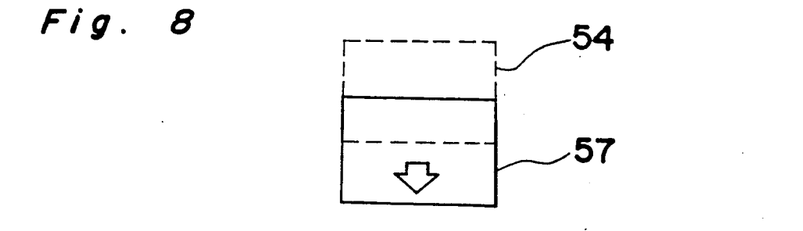
FIG. 8 is a diagram to show the shift of a frame.
Figure 9:
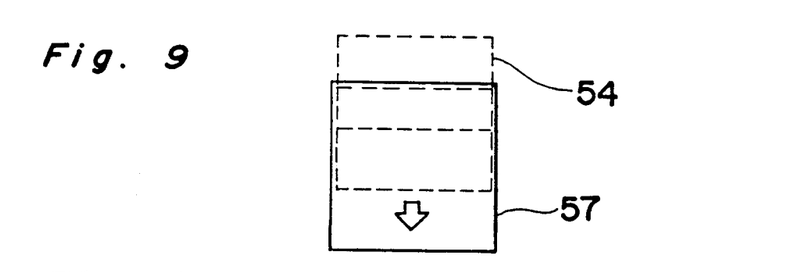
FIG. 9 is a diagram to show the enlargement of a frame.

The designation of respective areas 52 and 58 and the magnification can also be made with use of cursor move keys 41 to 44 arranged on the keyboard 4 for moving a cursor up, down, left and right, as shown in FIG. 7. If, for example, a key 42 for moving the cursor down is pushed after a source area 52 has been designated, the frame 54 of the source area 52 moves downward from a former position shown by a dashed line in FIG. 8 to a position shown by a solid line in the dame FIG. 8. The amount of the movement is determined by a number of times of key operations. The position (X,Y) of the first point 55 at the upper left apex of the frame 54 is determined to be a reference address for displaying the frame 54. Further, a magnification can be changed by operating one of the cursor move keys 41 to 44 and thereafter by pushing a shift key 45. If the shift key 45 as well as the cursor move down key 42 are pushed down after moving the frame 57 downwardly as shown in FIG. 8, the frame 57 is elongated downwardly fixing the upper side of the frame 57 at a position when the shift key 45 is pushed, as shown in FIG. 9. Thus, the magnification in the Y direction is changed. It is also changed with use of the cursor move up key 41 and the shift key 45.

Similarly, the magnification in the X direction can be changed by operating cursor move left and/or right keys 43 and/or 44 and the shift key 45.

Thus both of magnifications in the X and Y directions can be set on the scope of the image display apparatus.

Figure 10:
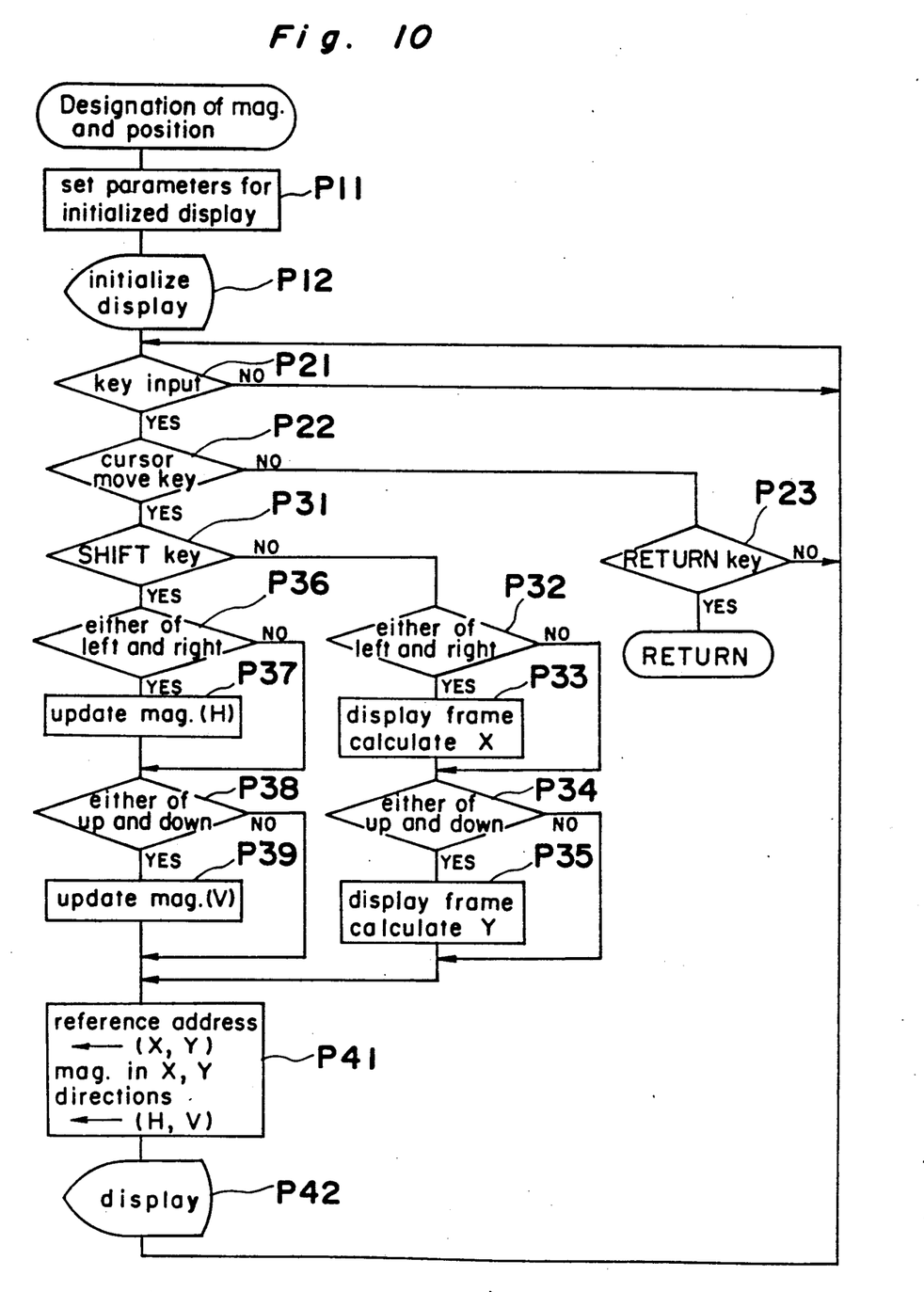
FIG. 10 is a flowchart of designating magnification and position.

FIG. 10 shows a flowchart of a subroutine program for designating an area and magnifications of a partial image to be edited with use of cursor move keys (step P4 in FIG. 4). First, parameters for displaying an initialized picture on the CRT scope 31 are set (step P11), and the initialized picture is displayed (step P12).

Then, a key-input is waited (step P21).

If the key-input is decided not to be the cursor move keys 41 to 44 (NO at step P22), a next key-input is waited again. However, if the key input is decided to be RETURN key (YES at step P23), the program returns to the main program.

If the key-input is decided to be one of the cursor keys 41 to 44 (YES at step P22), it is decided next if a key-input by the SHIFT key 45 is received (step P31).

When a key-input by the SHIFT key 45 is not received (NO at step P31) and if the key-input is decided to be either one of the cursor move left and right keys 43 and 44 (YES at step P32), the X address of the first point of the frame 57 is calculated by an addition and subtraction calculation based on the kind of the operated cursor move key and the frame 57 is displayed (step P33). Similarly, if the key-input is decided to be either one of the cursor move up and down keys 41 and 42 (YES at step P34) when the key-input of the SHIFT key 45 is not received (NO at step P31), the Y address of the first point of the frame 57 is calculated by an addition and subtraction calculation and the frame 57 is displayed (step P35). Then, the program proceeds to step P41.

When the key-input is decided to be one of the cursor move keys 41 to 44 (YES at step P22) and the key-input by the SHIFT key 45 is also decided to be received (YES at step P31), if the key-input is decided to be either one of the cursor move left and right keys 43 and 44 (YES at step P36), the magnification H in the X direction is calculated and is updated (step P37). Similarly, if the key-input is decided to be either one of the cursor move up and down keys 41 and 42 (YES at step P38) when the key-input by the SHIFT key 45 is received (YES at step P31), the magnification V in the Y direction is calculated and is updated (step P39).

Next, the reference addresses for displaying the frame 57 is set at the values (X, Y) which have been determined at steps P33 and P35, and the magnifications in the X and Y directions are set at the values determined at steps P37 and P39 (step P41), and the frame 57 is displayed on the scope 31 according to the data (step P42). At the same time, the present magnifications H and V are also displayed at the bottom portion of the scope 31. For example, in FIG. 5(e), the horizontal magnification H of 1.333 and the vertical magnification V of 1.400 as well as the frame are displayed on the scope 31. Then, the program returns to step P21 to wait a next key-input.

Figure 11:
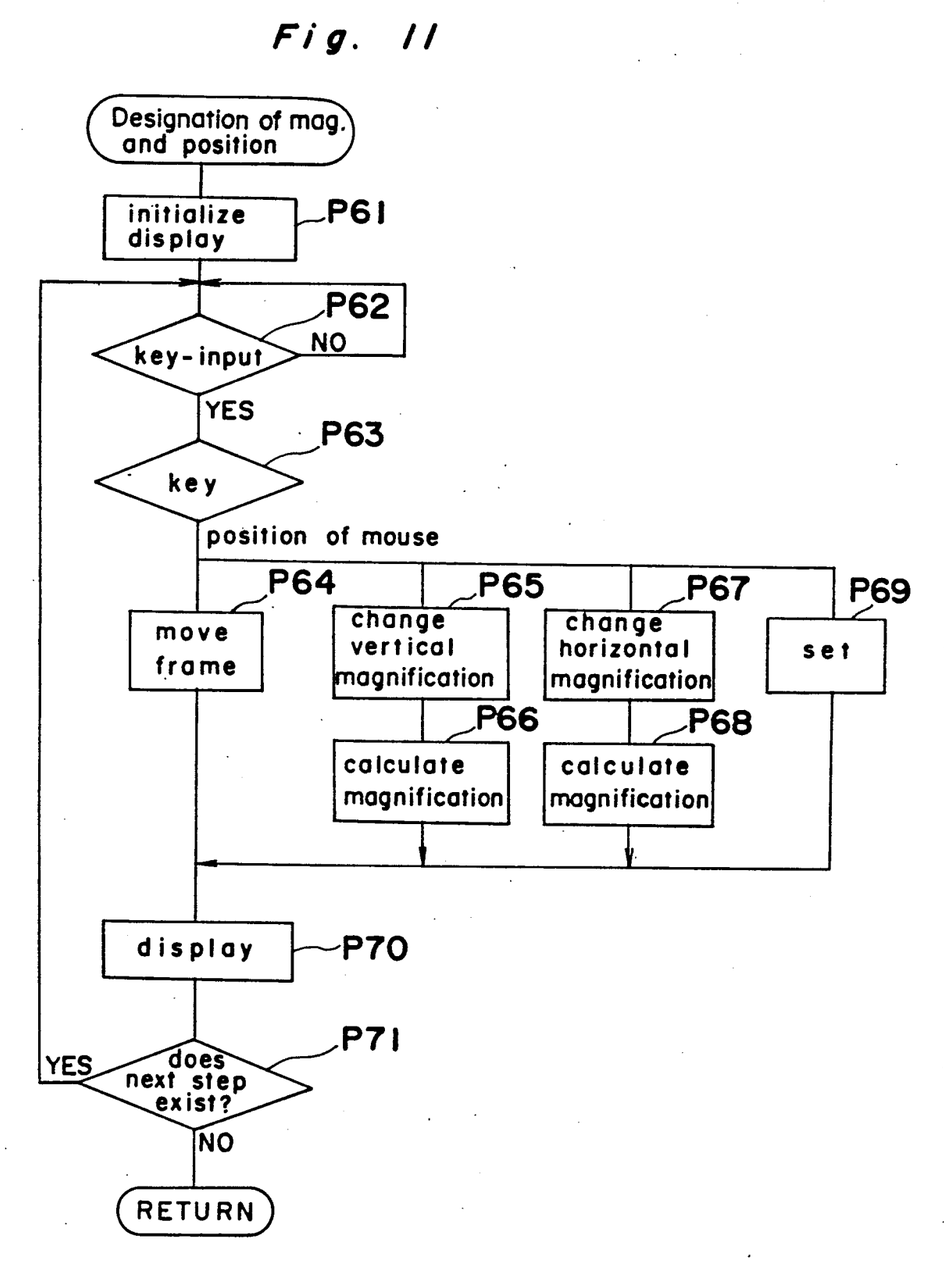
FIG. 11 is a flowchart of designating magnification and position.

The calculation of the address and the display of the frame is also possible by operating the mouse 5 instead of the cursor move keys 41 to 44. As shown in FIG. 6, information on a document image 32 displayed on the scope 31 such as the kind of a document is displayed at a display area 33 at the bottom of the document image 32. In a state shown in FIG. 6, the kind of a document is image, the size of the document is letter-vertical and the magnification is ½. A menu (icons) 34 for a copy mode of image editing is displayed further at the bottom of the scope 31. If an icon 34a of enlargement/reduction is selected, the program for the enlargement/reduction mode shown in FIG. 4 is executed. When the enlargement/reduction mode is executed with use of the mouse 5, the subroutine P4 of FIG. 4 is processed as shown in FIG. 11.

First, as shown in FIG. 5(a), the initialized state is displayed on the CRT scope 31 (step P61). In this state, the cross cursor 35 is displayed at the center of the scope 31. The menu 34 is vanished, and a message "Enter first point" is displayed in a message area 35.

Next, an input by the mouse 5 is waited (step P62). If an input is received, the program branches according to the kind of the input (step P63) to FRAME MOVEMENT (step P64), CHANGE IN THE VERTICAL MAGNIFICATION (step P65), CHANGE IN THE HORIZONTAL MAGNIFICATION (step P67) and SET (step P69).

Both changes in the vertical and horizontal magnifications (step P65 and P67) are performed upon entering the second point 56 of the transfer area 58 by moving the mouse while pressing a button of the mouse 5, and the magnifications in the vertical and horizontal directions are calculated at the same time (steps P66 and P68), respectively.

Next, the cross cursor 36 and the frame 57 are displayed on the scope (step P70).

Then, if a next step for designating the magnifications and position is decided to exist (YES at step P71), the program returns to step P62, and a next key-input is processed.

When the second point 56 of the transfer area 58 has been set at step P69, the program returns to the main flow because no further step exists (NO at step P71).

An example of operation with the mouse 5 will be explained below. After the initialized picture shown in FIG. 5(a) is displayed (step P1 in FIG. 4), the cross cursor 36 located at the center of the scope is moved with the mouse 5. Then, if the press button of the mouse 5 is pressed, the first point 51 of the source area 52 thus designated is displayed on the scope 31 as shown in FIG. 5(b) (step P2 in FIG. 4).

Next, the second point 53 of the source area 52 is specified similarly by operating the mouse 5 (step P3 in FIG. 4), and a frame 54 defined by the first and second points 51 and 53 is displayed on the scope 31 as shown in FIG. 5(c). The inside of the frame 54 is a source area 52 wherein a partial image to be transferred exists.

Then, a destination point is set. First, the frame 54 is moved by operating the mouse 5 (step P64 in FIG. 11) and, when the press button of the mouse 5 is pressed (step P69 in FIG. 11), a first point 55 is set as shown in FIG. 5(d). Next, the cross cursor 36 is moved by operating the mouse 5 while pressing the press button (steps P65, P67 in FIG. 11), a second point 56 can be set in a range of magnification from ⅛ to 8 and the magnification is changed when the second point 56 is designated (steps P66, P68 in FIG. 11). And, a frame 57 defined by the first and second points 55 and 56 is displayed on the scope 31 as shown in FIG. 5(e). The inside of the frame 57 is an area to which the partial image of the source area 52 is transferred. The magnifications are displayed in the display area 37 at the bottom of the image display area 32.

As explained above with reference to FIGS. 5(a) to 5(e), an operator can enlarge and/or reduce an image displayed on the scope 31 easily by operating the cursor and the frame on editing. This makes him apprehend intuitively an image after editing. Further, he can check the magnifications on operation by referring the values displayed in the display area 37. Thus, precise enlargement or reducing of a predetermined magnification can be edited easily.

Further, it is easy to display in the display area 37 the distance from the reference point 51 on the specification of the first point 55 of the transfer area 55. In such an embodiment, the precise location with relation to the destination point can be found readily.

It is also possible to define a destination area 58 by giving the distances in the horizontal direction between the first point 5 of the source area 52 and an upper left point of the destination area 58. Then, the position of the destination area 58 relative to the source area 52 is calculated, and the frame 57 of the destination area 58 is desplayed.

Still further, editing operations other than enlargement and reduction can also become easier by displaying editing parameters on the scope under an editing operation. For example, rotation of an image by an arbtrary angle can be edited easily by viewing a rotation angle displayed on the scope.

This invention may be embodied in still other ways without departing from the spirit of essential characters thereof. The preferred embodiments described herein are therefore illustrative and not restrictive, the scope of the invention being indicated by the appended claims and all variations which come within the meaning of the claims are intended to be embraced herein.

What is claimed is:

1. An image editing apparatus for performing an editing operation, comprising:
   display means for displaying an image on a scope thereof,
   means operably connected to said display means for editing the image displayed on the scope, said editing means including means for manually designating both first and second areas of the scope and means for transferring the image in the first area to the second area on the scope, and means operably connected to said display means and said editing means for indicating on the scope numerical information regarding the editing operation by the editing means.

2. An image editing apparatus according to claim 1, wherein said display means displays a cursor on the scope.

3. An image editing apparatus according to claim 2, wherein said designating means further comprises a means for moving the cursor on the scope for designating the size and location of said areas.

4. An image editing apparatus according to claim 3, wherein said means for moving the cursor comprises mouse means.

5. An image editing apparatus according to claim 4, wherein said designating means defines each of said first and second areas by designating with the cursor two diagonally opposite points on the scope, said first and second areas constituting source and destination areas, respectively.

6. An image editing apparatus according to claim 5, wherein said designating means defines said destination area of the same size as said source area in response to designating only one of the two diagonally opposing points of the destination area.

7. An image editing apparatus according to claim 5, wherein said designation means has function key means which is operated simultaneously with the cursor move means in order to designate the second point of the two diagonally opposing apexes of the destination area which has not the same size as the source area.

8. An image editing apparatus according to claim 3, wherein said designating means defines said first and second areas as source and destination areas, respectively, which are both in the shape of rectangles.

9. An image editing apparatus according to claim 8, wherein said designation means further comprises means to designate the distance between the source and destination areas and defines the destination area from the source area and the distance.

10. An image editing apparatus according to claim 3, wherein the means for moving the cursor comprises cursor move key means on a keyboard.

11. An image editing apparatus according to claim 1, wherein said information comprises magnification.

12. An image editing apparatus according to claim 11, wherein said indicating means calculates the magnification in the horizontal and vertical directions as a ratio of the size of the destination area to that of the source area.

13. An image editing apparatus according to claim 11, wherein said magnification information which is displayed by the indicating means includes information relating to magnification in two directions on the scope.

14. An image editing apparatus according to claim 11, wherein said information further comprises a distance between the source and destination areas.

15. An image editing apparatus according to claim 1, wherein the manually designating means comprises means for manually designating the sizes of the first and second areas independently of one another.

16. An image editing apparatus comprising:
display means for displaying an image on a scope thereof, means operably connected to said display means for designating a source area and a destination area in image data corresponding to the image displayed on the scope, means operably connected to said designating means for editing data corresponding to a partial image on the source area so as to transfer the partial image to the destination area, and means operably connected to said display means and said designating means for indicating magnification information on said scope regarding designation of the source area and the destination area on the scope of the display means.

17. An image editing apparatus, comprising:
display means for displaying an image on a scope thereof, said display means displaying a cursor on said scope, designating means operably connected to said display means an including means for moving said cursor on said scope for designating a rectangular source area and a rectangular destination area in image data corresponding to the image displayed on the scope, said designating means including means for designating a distance between the source and destination areas and for defining the destination area different from the source area and the distance therebetween, means operably connected to said designating means for editing a partial image on the source area so as to transfer it to the destination area, and means operably connected to said display means and said designating means for indicating numerical information regarding designation of the source area and the destination area on the scope of the display means.

18. A method of image editing, wherein an image in a first area of a scope is transferred to a second area of the scope, said method comprising the steps of:
inputting to a calculating means information designating the first and second areas of the scope, so that said calculating means calculates a transfer magnification for magnifying the first area to fill the second area based upon said input information, displaying on the scope a numerical figure corresponding to the transfer magnification and transferring the image in the first area to the second area of the scope.

19. A method according to claim 18 further comprising the step of displaying on the scope the first and second areas in accordance with the input information.

20. A method of image editing, wherein an image in a first area of a scope is transferred to a second area of the scope, said method comprising the steps of:
inputting to a computer a first information designating the first area of the scope, inputting to the computer a second information designating the second area of the scope, inputting to the computer a third information regarding transferring the image from the first area to the second area, causing the computer to display on the scope a numerical figure corresponding to the third information and transferring the image of the first area to the second area of the scope.

* * * * *